US012624267B2

(12) United States Patent
Yamada

(10) Patent No.: US 12,624,267 B2
(45) **Date of Patent: *May 12, 2026**

(54) THERMAL CONDUCTIVE SILICONE COMPOSITION

(71) Applicant: SHIN-ETSU CHEMICAL CO., LTD., Tokyo (JP)

(72) Inventor: Kunihiro Yamada, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 795 days.

This patent is subject to a terminal disclaimer.

(21) Appl. No.: 17/917,068

(22) PCT Filed: Mar. 29, 2021

(86) PCT No.: PCT/JP2021/013200

§ 371 (c)(1),
(2) Date: Oct. 5, 2022

(87) PCT Pub. No.: WO2021/210372

PCT Pub. Date: Oct. 21, 2021

(65) Prior Publication Data

US 2023/0183540 A1 Jun. 15, 2023

(30) Foreign Application Priority Data

Apr. 17, 2020 (JP) ................................ 2020-073777

(51) Int. Cl.

| | |
|---|---|
| ***C09K 5/06*** | (2006.01) |
| ***C08K 3/08*** | (2006.01) |
| ***C08K 3/22*** | (2006.01) |
| ***C08K 3/28*** | (2006.01) |
| ***C08K 3/38*** | (2006.01) |
| ***C08L 83/06*** | (2006.01) |

(52) U.S. Cl.

CPC ................ *C09K 5/063* (2013.01); *C08K 3/08* (2013.01); *C08K 3/22* (2013.01); *C08K 3/28* (2013.01); *C08K 3/38* (2013.01); *C08L 83/06* (2013.01); *C08K 2003/0837* (2013.01); *C08K 2003/222* (2013.01); *C08K 2003/2227* (2013.01); *C08K 2003/2296* (2013.01); *C08K 2003/282* (2013.01); *C08K 2003/385* (2013.01); *C08K 2201/014* (2013.01); *C08L 2205/025* (2013.01)

(58) Field of Classification Search

CPC ............. C09K 5/063; C08L 2205/025; C08K 2003/0837; C08K 2003/222; C08K 2003/2227; C08K 2003/2296; C08K 2003/282; C08K 2003/385; C08K 2201/014

See application file for complete search history.

(56) References Cited

U.S. PATENT DOCUMENTS

| | | | | |
|---|---|---|---|---|
| 6,884,314 | B2 * | 4/2005 | Cross | C08L 83/04 524/588 |
| 2003/0127496 | A1 | 7/2003 | Tetsuka et al. | |
| 2005/0084691 | A1 | 4/2005 | Endo et al. | |
| 2005/0228097 | A1 | 10/2005 | Zhong | |
| 2013/0087905 | A1 | 4/2013 | Yamada et al. | |
| 2016/0208156 | A1 * | 7/2016 | Kitazawa | C08K 3/22 |
| 2017/0096591 | A1 | 4/2017 | Akiba et al. | |
| 2021/0284803 | A1 | 9/2021 | Akiba et al. | |

FOREIGN PATENT DOCUMENTS

| | | | | |
|---|---|---|---|---|
| CN | 103087530 | A | 5/2013 | |
| CN | 103772991 | A | 5/2014 | |
| CN | 106905704 | A | 6/2017 | |
| JP | 2003-176414 | A | 6/2003 | |
| JP | 2003-218296 | A | 7/2003 | |
| JP | 2004-39829 | A | 2/2004 | |
| JP | 2005-112961 | A | 4/2005 | |
| JP | 2007-106809 | A | 4/2007 | |
| JP | 2010-095730 | A | 4/2010 | |
| JP | 2011246536 | A * | 12/2011 | |
| JP | 2012-111823 | A | 6/2012 | |
| JP | 2013-010862 | A | 1/2013 | |
| JP | 2013-082816 | A | 5/2013 | |
| JP | 2015-78296 | A | 4/2015 | |
| KR | 1020130039305 | A | 4/2013 | |
| TW | 201625725 | A | 7/2016 | |
| TW | 201821584 | A | 6/2018 | |
| WO | 2016/056286 | A1 | 4/2016 | |
| WO | WO-2018079362 | A1 * | 5/2018 | C09J 183/04 |

OTHER PUBLICATIONS

Claivate Analytics machine translation of JP 2011246536 A to Tsuji Kenichi, published Dec. 8, 2011 (Year: 2011).*

Jan. 10, 2024 Office Action issued in Chinese Patent Application No. 202180027870.6.

Han, X. et al., "Applied research progress of silicone encapsulant," Fine and Speciality Chemicals, Jul. 2022, vol. 30, No. 7, pp. 21-25.

Aug. 23, 2023 Office Action issued in Chinese Patent Application No. 202180027870.6.

Oct. 11, 2022 Office Action and Search Report issued in Taiwanese Patent Application No. 110112281.

Apr. 3, 2024 extended Search Report issued in European Patent Application No. 21788841.1.

Oct. 13, 2022 International Preliminary Report on Patentability in International Patent Application No. PCT/JP2021/013200.

(Continued)

*Primary Examiner* — Jane L Stanley

(74) *Attorney, Agent, or Firm* — Oliff PLC

(57) ABSTRACT

A thermal conductive silicone composition includes (A) 100 parts by mass of an organopolysiloxane having a kinematic viscosity at 25° C. of 10 to 500,000 $mm^2/s$; (B) 10 to 2,000 parts by mass of a thermal conductive filler having an average particle size of 0.01 to 100 μm; and (C) 1,000 to 10,000 parts by mass of gallium or a gallium alloy having a melting point of −20 to 100° C. The resulting thermal conductive silicone composition has excellent thermal conduction property.

4 Claims, No Drawings

(56) References Cited

OTHER PUBLICATIONS

Jan. 4, 2022 Office Action issued in Taiwanese Patent Application No. 110112281.
May 11, 2021 International Search Report Issued in International Patent Application No. PCT/JP2021/013200.
Dec. 13, 2022 Office Action issued in Japanese Patent Application No. 2020-073777.
Mar. 18, 2025 Office Action issued in European Patent Application No. 21788841.1.
Nov. 24, 2025 Office Action issued in Korean Patent Application No. 10-2022-7035228.

* cited by examiner

THERMAL CONDUCTIVE SILICONE COMPOSITION

TECHNICAL FIELD

The present invention relates to a thermal conductive silicone composition having excellent thermal conduction property.

BACKGROUND ART

For example, a heat dissipating body such as a heat sink has been widely used in many of heat-generating electronic parts such as CPU for preventing damages, performance deterioration, or the like due to temperature raise during use. For efficiently conducting heat generated by the heat-generating electronic part to the heat dissipating body, thermal conductive material is generally used between the heat-generating electronic part and the heat dissipating body.

Heat-dissipating sheets and heat-dissipating grease are generally known as the thermal conductive material. The heat-dissipating sheets can be easily mounted, but a void occurs in an interface with the heat-generating electronic part or the heat dissipating body, thereby the interfacial thermal resistance increases, and the thermal conductive performance becomes insufficient. On the contrary, the heat-dissipating grease is close to liquid in its property, so that the interfacial thermal resistance can be reduced by adhering to both the heat-generating electronic part and the heat dissipating body without being affected by unevenness of the surfaces thereof. However, sufficient heat-dissipating performance cannot be obtained.

For example, Patent Documents 1 to 5 propose, as a component for imparting thermal conduction property, materials incorporating a low melting point metal, a metal filler, or the like. However, due to further increases in amount of heat generation accompanying high integration and speeding up of the heat-generating electronic parts in recent years, these thermal conductive materials cannot provide sufficient thermal conduction effect.

CITATION LIST

Patent Literature

Patent Document 1: JP 2003-176414 A
Patent Document 2: JP 2005-112961 A
Patent Document 3: JP 2003-218296 A
Patent Document 4: JP 2004-039829 A
Patent Document 5: JP 2007-106809 A

SUMMARY OF INVENTION

Technical Problem

The present invention has for its object to address such problems, and to provide a thermal conductive silicone composition having excellent thermal conduction property.

Solution to Problem

To solve the above problem, the present invention provides a thermal conductive silicone composition comprising the following components (A) to (C):

(A) 100 parts by mass of an organopolysiloxane having a kinematic viscosity at 25° C. of 10 to 500,000 $mm^2/s$;

(B) 10 to 2,000 parts by mass of a thermal conductive filler having an average particle size of 0.01 to 100 μm; and (C) 1,000 to 10,000 parts by mass of gallium or a gallium alloy having a melting point of −20 to 100° C.

Such a thermal conductive silicone composition has excellent thermal conduction property.

Additionally, in the present invention, the thermal conductive silicone composition preferably comprises the component (A) which does not comprise an alkenyl group.

Such a thermal conductive silicone composition has excellent thermal resistance.

Moreover, in the present invention, the thermal conductive silicone composition preferably comprises one or more selected from a zinc oxide powder, an alumina powder, a boron nitride powder, an aluminum nitride powder, an aluminum hydroxide powder, and a magnesium oxide powder as the component (B).

Such a thermal conductive silicone composition may have further improved thermal conduction property.

Furthermore, in the present invention, the thermal conductive silicone composition preferably comprises, as the component (A), an organopolysiloxane represented by the following average composition formula (1), $$R^1_aSiO_{(4-a)/2} \quad (1)$$

wherein $R^1$ each independently represents an unsubstituted or substituted monovalent hydrocarbon group having a carbon number of 1 to 18 without containing an alkenyl group, and $1.8 \le a \le 2.2$.

Such a thermal conductive silicone composition may have preferable flowability.

Furthermore, in the present invention, the thermal conductive silicone composition preferably comprises, as the component (A), a hydrolysable group-containing organopolysiloxane represented by the following general formula (2) in an amount of 10 to 100% by mass relative to the total mass of the component (A), (2)

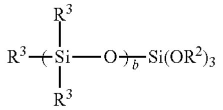

wherein $R^2$ represents an alkyl group having a carbon number of 1 to 6, $R^3$ each independently represents an unsubstituted or substituted monovalent hydrocarbon group having a carbon number of 1 to 18 without containing an alkenyl group, and "b" represents an integer of 5 to 120.

In such thermal conductive silicone composition, the silicone composition may be highly filled with a powder.

Furthermore, in the present invention, the thermal conductive silicone composition preferably comprises, as the gallium alloy of the component (C), one or more selected from a Ga—In alloy, a Ga—Sn—Zn alloy, a Ga—In—Sn alloy, and a Ga—In—Bi—Sn alloy.

Such a thermal conductive silicone composition may have excellent workability in a process of preparing the composition.

Advantageous Effects of Invention

As described above, the thermal conductive silicone composition of the invention may have excellent thermal conduction property.

DESCRIPTION OF EMBODIMENTS

As stated above, there have been demands for the development of a thermal conductive silicone composition having excellent thermal conduction property.

The present inventors have earnestly studied to achieve the above object, and consequently found that when a thermal conductive filler and a low melting point metal having a melting point of −20 to 100° C. are mixed with a specific organopolysiloxane, excellent thermal conductive performance is exhibited. This finding has led to the completion of the present invention.

Namely, the present invention is the thermal conductive silicone composition comprising the following components (A) to (C):

(A) 100 parts by mass of an organopolysiloxane having a kinematic viscosity at 25° C. of 10 to 500,000 $mm^2/s$;

(B) 10 to 2,000 parts by mass of a thermal conductive filler having an average particle size of 0.01 to 100 μm; and (C) 1,000 to 10,000 parts by mass of gallium or a gallium alloy having a melting point of −20 to 100° C.

Hereinafter, the present invention will be described in detail, but the present invention is not limited thereto.

Component (A)

The component (A) is an organopolysiloxane having a kinematic viscosity at 25° C. of 10 to 500,000 $mm^2/s$, preferably 30 to 100,000 $mm^2/s$, and further preferably 30 to 10,000 $mm^2/s$. If the kinematic viscosity of the organopolysiloxane is lower than the above lower limit, oil bleeding tends to occur when the organopolysiloxane is formed into grease. On the contrary, if the kinematic viscosity of the organopolysiloxane is greater than the above upper limit, the extensibility of the silicone composition may decrease, and thus is not preferable. In the present invention, the kinematic viscosity of the organopolysiloxane refers to a value measured at 25° C. using an Ostwald viscometer.

In the present invention, the organopolysiloxane of the component (A) may be any organopolysiloxane having the above kinematic viscosity, and a conventionally known organopolysiloxane may be used. The molecular structure of the organopolysiloxane is not particularly limited, and may be any of linear, branched, cyclic, or the like. Particularly preferable is a linear structure in which the main chain is composed of repeating diorganosiloxane units and both terminals of the molecular chain are blocked with triorganosiloxy groups. One kind of the organopolysiloxane may be used alone, or two or more kinds thereof may be used in combination. In view of the thermal resistance, the component (A) preferably does not comprise an alkenyl group.

The organopolysiloxane of the component (A) may be the organopolysiloxane represented by the following average composition formula (1).

$$R^1_aSiO_{(4-a)/2} \quad (1)$$

In the above formula (1), $R^1$ does not comprise an alkenyl group, and each independently represents an unsubstituted or substituted monovalent hydrocarbon group having a carbon number of 1 to 18, preferably 1 to 14. Examples of the monovalent hydrocarbon group include alkyl groups such as a methyl group, an ethyl group, a propyl group, a hexyl group, an octyl group, a decyl group, a dodecyl group, a tetradecyl group, a hexadecyl group, and an octadecyl group; cycloalkyl groups such as a cyclopentyl group and a cyclohexyl group; aryl groups such as a phenyl group and a tolyl group; aralkyl groups such as a 2-phenylethyl group and a 2-methyl-2-phenylethyl group; as well as these groups in which a part or all of the hydrogen atoms are substituted with a halogen atom such as fluorine, bromine, and chlorine, a cyano group or the like, for example, a 3,3,3-trifluoropropyl group, a 2-(perfluorobutyl) ethyl group, a 2-(perfluorooctyl) ethyl group, and a p-chlorophenyl group.

In the above formula (1), "a" is preferably a number in a range of 1.8 to 2.2, in particular, in a range of 1.9 to 2.1. When "a" is within the above range, the thermal conductive silicone composition to be obtained may have favorable viscosity.

The organopolysiloxane represented by the average composition formula (1) is preferably a linear organopolysiloxane represented by the following formula (3).

(3)

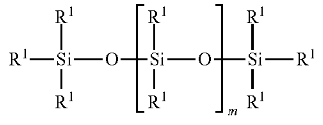

In the above formula (3), $R^1$ does not comprise an alkenyl group, and each independently represents an unsubstituted or substituted monovalent hydrocarbon group having a carbon number of 1 to 18, preferably 1 to 14. Examples of the monovalent hydrocarbon group include the groups mentioned above. In particular, it is preferable that $R^1$ at both terminals are all methyl groups. m is a number with which the organopolysiloxane has a kinematic viscosity at 25° C. of 10 to 500,000 $mm^2/s$, preferably 30 to 100,000 $mm^2/s$, and more preferably 30 to 10,000 $mm^2/s$.

Furthermore, the component (A) may contain an organopolysiloxane having a hydrolysable group represented by the following general formula (2) in addition to the organopolysiloxane represented by the above average composition formula (1). The content of the hydrolysable organopolysiloxane in the component (A) is preferably 10 to 100% by mass, more preferably 30 to 90% by mass, and further preferably 50 to 90% by mass relative to the total mass of the component (A), (2)

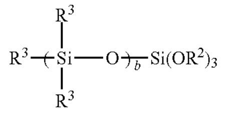

wherein $R^2$ represents an alkyl group having a carbon number of 1 to 6, $R^3$ each independently represents an unsubstituted or substituted monovalent hydrocarbon group having a carbon number of 1 to 18 without containing an alkenyl group, and "b" is 5 to 120.

The organopolysiloxane represented by the above formula (2) assists in filling the silicone composition with powders at high content. Further, by including the above organopolysiloxane in the silicone composition, surfaces of powders are covered with the above organopolysiloxane, and thus agglomeration of powders is less likely to occur. Since this effect is maintained even at a high temperature, the thermal resistance of the silicone composition is improved. In addition, it is also possible to perform hydrophobization treatment on the surfaces of the powders by the above organopolysiloxane.

In the above formula (2), $R^2$ represents an alkyl group having a carbon number of 1 to 6. Examples thereof include alkyl groups having a carbon number of 1 to 6 such as a methyl group, an ethyl group, and a propyl group. Among them, a methyl group and an ethyl group are preferred. $R^3$ does not comprise an alkenyl group, and each independently represents an unsubstituted or substituted monovalent hydrocarbon group having a carbon number of 1 to 18, preferably 1 to 10. Examples of the monovalent hydrocarbon group include alkyl groups such as a methyl group, an ethyl group, a propyl group, a hexyl group, an octyl group, a decyl group, a dodecyl group, a tetradecyl group, a hexadecyl group, and an octadecyl group; cycloalkyl groups such as a cyclopentyl group and a cyclohexyl group; aryl groups such as a phenyl group and a tolyl group; aralkyl groups such as a 2-phenylethyl group and a 2-methyl-2-phenylethyl group; as well as these groups in which a part or all of the hydrogen atoms are substituted with a halogen atom such as fluorine, bromine, and chlorine, a cyano group or the like, for example, a 3,3,3-trifluoropropyl group, a 2-(perfluorobutyl) ethyl group, a 2-(perfluorooctyl) ethyl group, and a p-chlorophenyl group. In particular, a methyl group is preferable. In the above formula (2), "b" is an integer of 5 to 120, preferably an integer of 10 to 90.

Component (B)

B) is a thermal conductive filler. Type Type of the thermal conductive filler is not particularly limited, and a powder conventionally used in heat-dissipating (thermal conductive) grease can be used. In particular, one having high thermal conductivity is preferred, and preferred is at least one or two or more selected from a zinc oxide powder, an alumina powder, a boron nitride powder, an aluminum nitride powder, an aluminum oxide powder, and a magnesium oxide powder. Surfaces of these inorganic compound powders may be subjected to hydrophobization treatment by an organosilane, an organosilazane, an organopolysiloxane, an organic fluorine compound, or the like as necessary. The hydrophobization treatment may be performed using the organopolysiloxane represented by the above formula (2).

The average particle size of the thermal conductive filler is 0.01 to 100 μm, more preferably 0.1 to 80 μm, and still more preferably 0.5 to 50 μm. Both of a case in which the average particle size of the thermal conductive filler is lower than the above lower limit, and a case in which the average particle size of the thermal conductive filler is higher than the above upper limit, are not preferable, since the filling rate of the obtained silicone composition cannot be increased. One kind of the thermal conductive filler may be used alone, or two or more kinds thereof having different average particle sizes may be used in a mixture. The above average particle size is a volume-based cumulative average particle size. The average particle size can be measured using a particle size analyzer Microtrac MT3300EX manufactured by Nikkiso Co., Ltd.

An amount of the thermal conductive filler blended is in a range of to 10 to 2,000 parts by mass, and preferably 100 to 1,500 parts by mass relative to 100 parts by mass of the component (A). More preferably, it is in a range of 100 to 1,000 parts by mass. When the amount blended is less than the above lower limit, sufficient thermal conductivity cannot be imparted to the silicone composition. On the contrary, when the amount blended is above the upper limit, the silicone composition becomes to have high viscosity, and thus is hard to handle.

Component (C)

The component (C) of the present invention is gallium or a gallium alloy, and the melting point thereof is required to be in a range of −20 to 100° C. One having the melting point under −20° C. is difficult to produce, and thus is economically unfavrable. On the contrary, if the melting point is higher than 100° C., the component does not quickly dissolve in a process of preparing the compositoin to result in poor workability, and further the component precipitates during production to result in a nonuniform composition. Therefore, it is necessary and also suitable for the gallium or gallium alloy to have the melting point in the range of −20 to 100° C. in terms of handling as well as economy. In particular, one having the melting point in a range of −20 to 50° C. is preferable.

The melting point of metallic gallium is 29.8° C. Representative examples of the gallium alloy having a melting point in the above mentioned range include a gallium-indium alloy, e.g., Ga—In (mass ratio of 75.4:24.6, melting point of 15.7° C.); a gallium-tin-zinc alloy, e.g., Ga—Sn—Zn (mass ratio of 82:12:6, melting point of 17° C.); a gallium-indium-tin alloy, e.g., Ga—In—Sn (mass ratio of 21.5:16.0:62.5, melting point of 10.7° C., and mass ratio of 68.5:21.5:10, melting point of −19° C.); a gallium-indium-bismath-tin alloy, e.g., Ga—In—Bi—Sn (mass ratio of 9.4:47.3:24.7:18.6, melting point of 48.0° C.).

One kind of the component (C) may be used alone, or two or more kinds thereof may be used in combination.

Generally, the shape of liquid particulates or solid particulates of gallium or an alloy thereof present in the composition of the present invention is substantially spherical, but irregular-shaped ones may be contained. Further, it is preferable that the average particle size of the particulates is generally 0.1 to 200 μm, particularly 10 to 100 μm. When the average particle size is the above lower limit or more, coating workability is excellent since the viscosity of the composition does not become too high and excellent extensibility is provided. On the contrary, when the average particle size is the above upper limit or less, the composition does not separate. The dispersion state of particulates having the above shape and average particle size is maintained even in a case where the composition is stored at normal temperature since the composition has suitable viscosity. The particle size of the component (C) can be measured using a microscope VR-3200 manufactured by Keyence Corporation. Specifically, the composition of the present invention is sandwiched between two glass slides and a diameter of the particle is directly measured by a microscope to determine the particle size.

The component (C) is blended in an amount of 1,000 to 10,000 parts by mass, and particularly preferably 2,000 to 7,000 parts by mass, relative to 100 parts by mass of the above component (A). When the above amount blended is less than 1,000 parts by mass, the thermal conductivity is lowered, and when the composition is thick, sufficient heat-dissipation performance cannot be obtained. When the above amount blended is more than 10,000 parts by mass, it is difficult to obtain a uniform composition, and further, there is a problem that the composition cannot be obtained as grease having extensibility due to too high viscosity of the composition.

(Other Components)

Further, the silicone composition of the present invention may contain a conventionally known antioxidant, dye, pigment, flame retardant, antisettling agent, or thixotropy enhancer in an amount according to purpose, as necessary.

The production method of the thermal conductive silicone composition of the present invention may be in accordance with the conventionally known methods for producing silicone grease compositions, and is not particularly limited. For example, the thermal conductive silicone composition of the present invention can be obtained by mixing the components (A) to (C) and, as necessary, other components using mixers such as Trimix, Twinmix, Planetary Mixer (all registered trademarks, mixers manufactured by Inoue MFG., Inc.), Ultramixer (registered trademark, a mixer manufactured by Mizuho Industrial Co., Ltd.) or Hivis Disper Mix (registered trademark, a mixer manufactured by Tokushu Kika Kogyo Co., Ltd.) for 30 minutes to 4 hours. When the component (C) is solid at room temperature, it is desirable to dissolve the component in an oven beforehand, and then the dissolved component is blended. Alternatively, the components may be mixed while being heated at a temperature range of 50 to 150° C., as necessary.

The thermal conductive silicone composition of the present invention has the absolute viscosity measured at 25° C. of 10 to 500 Pa·s, preferably 50 to 450 Pa·s, and more preferably 50 to 400 Pa·s. When the absolute viscosity is the above upper limit or less, workability is improved. When the absolute viscosity is the above lower upper limit or more, the composition does not flow out after being coated on various substrates, and thus preferable grease can be provided. The above absolute viscosity can be achieved by preparation the amount of each component blended as described above. The above absolute viscosity can be measured using a model number PC-1TL (10 rpm) manufactured by Malcom Co., Ltd.

The thermal conductive silicone composition of the present invention may have high thermal conductivity of 3.0 W/mK or more, preferably 4.0 W/mK or more, and more preferably 5.0 W/mK or more at 25° C.

The thermal conductive silicone composition of the present invention can be used as grease. The aspect in which the silicone composition of the present invention is used as grease is not particularly limited, and the composition may be used in the same manner as conventional heat-dissipating (thermal conductive) silicone grease. For example, the composition may be suitably used in an aspect in which the grease is sandwiched between an electric or electronic component such as an LSI or other heat-generating members and a cooling member or a heat-dissipating member to transfer heat from the heat-generating member to the cooling member or the heat-dissipating member, thereby dissipating heat. Since the silicone composition of the present invention has low viscosity, high thermal conductivity, and quite excellent shift resistance, it can be suitably used as heat-dissipating (thermal conductive) grease for semiconductor devices or the like of high-grade equipment.

EXAMPLE

Hereinafter, the present invention will be specifically described with reference to Examples and Comparative Examples. However, the present invention is not limited thereto.

Component (A)

(A-1) Dimethylpolysiloxane with both terminals blocked with trimethylsilyl groups, having a kinematic viscosity at 25° C. of 1,000 $mm^2/s$ (A-2) Dimethylpolysiloxane with both terminals blocked with trimethylsilyl groups, having a kinematic viscosity at 25° C. of 5,000 $mm^2/s$ (A-3) Organopolysiloxane represented by the following formula (4) and having a kinematic viscosity at 25° C. of 35 $mm^2/s$ (4)

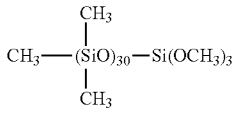

Component (B)

(B-1) Zinc oxide powder: average particle size 1.0 μm (B-2) Alumina powder: average particle size 8.9 μm (B-3) Boron nitride powder: average particle size 2.0 μm (B-4) Aluminum nitride powder: average particle size 6.8 μm (B-5) Aluminum hydroxide powder: average particle size 25 μm (B-6) Magnesium oxide powder: average particle size 45 μm Component (C)

(C-1) Metallic gallium (melting point of 29.8° C.)

(C-2) Ga—In alloy (mass ratio of 75.4:24.6, melting point of 15.7° C.)

(C-3) Ga—In—Bi—Sn alloy (mass ratio of 9.4:47.3:24.7:18.6, melting point of 48.0° C.)

(C-4) Ga—In—Sn alloy (mass ratio of 68.5:21.5:10, melting point of −19° C.)

(C-5) Metallic indium (melting point of 156.2° C.) <For comparison>

Examples 1 to 6 and Comparative Examples 1 to 5

Preparation of Silicone Composition

The above components (A), (B), and (C) were placed in a 5-liter Planetary Mixer (registered trademark, manufactured by Inoue MFG., Inc.) according to the compositions and formulations shown in the following Tables 1 and 2, and the mixture was stirred at room temperature for 1 hour to prepare silicone compositions.

(C-1), (C-3), and (C-5) having the melting points higher than room temperature were dissolved in an oven beforehand, and then placed in the mixer.

<Viscosity Measurement>

The absolute viscosity of the compositions at 25° C. was measured using the model number PC-1TL (10 rpm) manufactured by Malcom Co., Ltd.

<Thermal Conductivity Measurement>

The thermal conductivity was measured at 25° C. using TPS-2500S manufactured by Kyoto Electronics Manufacturing Co., Ltd.

<Particle Size Measurement>

The particle size measurement of the thermal conductive filler (component (B)) is a volume-based cumulative average particle size measured with a particle size analyzer Microtrac MT3300EX manufactured by Nikkiso Co., Ltd.

TABLE 1

| | | | Examples | | | | | |
|---|---|---|---|---|---|---|---|---|
| | | | 1 | 2 | 3 | 4 | 5 | 6 |
| Composition (parts by mass) | Component (A) | A-1 | 25 | | 20 | 10 | 25 | 20 |
| | | A-2 | | 50 | | | | |
| | | A-3 | 75 | 50 | 80 | 90 | 75 | 80 |
| | Component (B) | B-1 | 560 | | 300 | 100 | | 200 |
| | | B-2 | | 900 | | | | |
| | | B-3 | | | 100 | | | |
| | | B-4 | | | | 100 | | |
| | | B-5 | | | | | 300 | |
| | | B-6 | | | | | | 300 |
| | Component (C) | C-1 | 3200 | | | | 3200 | 3200 |
| | | C-2 | | 2200 | | | | |
| | | C-3 | | | 3500 | | | |
| | | C-4 | | | | 6200 | | |
| Absolute viscosity (Pa · s) | | | 220 | 150 | 230 | 380 | 180 | 150 |
| Thermal conductivity (W/mK) | | | 8.2 | 7.0 | 8.4 | 9.5 | 8.4 | 8.5 |

TABLE 2

| | | | Comparative Examples | | | | |
|---|---|---|---|---|---|---|---|
| | | | 1 | 2 | 3 | 4 | 5 |
| Composition (parts by mass) | Component (A) | A-1 | 25 | 25 | 25 | 25 | 25 |
| | | A-2 | | | | | |
| | | A-3 | 75 | 75 | 75 | 75 | 75 |
| | Component (B) | B-1 | | 3000 | 560 | 560 | 560 |
| | | B-2 | | | | | |
| | | B-3 | | | | | |
| | | B-4 | | | | | |
| | | B-5 | | | | | |
| | | B-6 | | | | | |
| | Component (C) | C-1 | 3200 | 3200 | 500 | 12000 | |
| | | C-2 | | | | | |
| | | C-3 | | | | | |
| | | C-4 | | | | | |
| | | C-5 | | | | | 3200 |
| Absolute viscosity (Pa · s) | | | Composition immediately separates into two layers | Composition does not become a paste | 30 | Composition immediately separates into two layers | Component (C) precipitates and the composition becomes non-uniform |
| Thermal conductivity (W/mK) | | | — | — | 1.5 | — | — |

As shown in Table 1, the thermal conductive silicone compositions prepared in Examples 1 to 6 have the absolute viscosity of 50 to 400 Pa·s, and high thermal conductivity of 5.0 W/mK or more.

Meanwhile, as shown in Table 2, in a case where the component (B) is not contained as in Comparative Example 1, the composition separates into two layers. In a case where the content of the component (B) is too large, the composition does not become a paste as in Comparative Example 2. In a case where the content of the component (C) is too small, the thermal conductivity is lowered as in Comparative Example 3. In a case where the content of the component (C) is too large, the composition separates into two layers as in Comparative Example 4. In a case where the melting point of the component (C) is too high, the component (C) precipitates and the composition becomes nonuniform as in Comparative Example 5.

As described above, a thermal conductive silicone composition which is uniform and excellent in thermal conductivity may be achieved by the thermal conductive silicone composition of the present invention without causing two-layer separation or precipitation of the component (C).

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A thermal conductive silicone composition comprising the following components (A) to (C):

(A) 100 parts by mass of an organopolysiloxane having a kinematic viscosity at 25° C. of 10 to 500,000 $mm^2/s$, wherein the organopolysiloxane comprises an organopolysiloxane having a hydrolysable group represented by the following general formula (2) and a linear organopolysiloxane represented by the following formula (3):

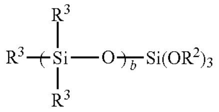

(2)

wherein $R^2$ represents an alkyl group having a carbon number of 1 to 6, $R^3$ each independently represents an unsubstituted or substituted monovalent hydrocarbon group having a carbon number of 1 to 18 without containing an alkenyl group, and b is 5 to 120,

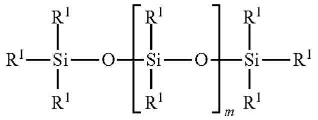

(3)

wherein $R^1$ does not comprise an alkenyl group, and each independently represents an unsubstituted or substituted monovalent hydrocarbon group having a carbon number of 1 to 18, and m is a number with which the organopolysiloxane has a kinematic viscosity at 25° C. of 10 to 500,000 $mm^2/s$, wherein the component (A) comprises the hydrolysable group-containing organopolysiloxane represented by the general formula (2) in an amount of 30 to 90% by mass relative to the total mass of the component (A);

(B) 10 to 2,000 parts by mass of a thermal conductive filler having an average particle size of 0.01 to 100 μm; and (C) 1,000 to 10,000 parts by mass of gallium or a gallium alloy having a melting point of −20 to 100° C.

2. The thermal conductive silicone composition according to claim 1, wherein the component (B) is one or more selected from a zinc oxide powder, an alumina powder, a boron nitride powder, an aluminum nitride powder, an aluminum hydroxide powder, and a magnesium oxide powder.

3. The thermal conductive silicone composition according to claim 1, wherein the gallium alloy of the component C is one or more selected from a Ga—In alloy, a Ga—Sn—Zn alloy, a Ga—In—Sn alloy, and a Ga—In—Bi—Sn alloy.

4. The thermal conductive silicone composition according to claim 2, wherein the gallium alloy of the component (C) is one or more selected from a Ga—In alloy, a Ga—Sn—Zn alloy, a Ga—In—Sn alloy, and a Ga—In—Bi—Sn alloy.

* * * * *